US006969478B1

(12) United States Patent
Hetzel, Jr.

(10) Patent No.: US 6,969,478 B1
(45) Date of Patent: Nov. 29, 2005

(54) FIBERGLASS COMPOSITE FIREFIGHTING HELMET AND METHOD FOR MAKING A FIBERGLASS COMPOSITE FIREFIGHTING HELMET

(75) Inventor: John M. Hetzel, Jr., Dayton, OH (US)

(73) Assignee: Lion Apparel, Inc., Dayton, OH (US)

( * ) Notice: Subject to any disclaimer, the term of this patent is extended or adjusted under 35 U.S.C. 154(b) by 0 days.

(21) Appl. No.: 09/689,131

(22) Filed: Oct. 12, 2000

(51) Int. Cl.[7] .............................................. B29C 70/46
(52) U.S. Cl. ...................... 264/137; 264/140; 264/255; 264/257; 264/267; 264/271.1; 264/279.1; 264/324; 264/337
(58) Field of Search ................................ 264/137, 138, 264/142, 143, 255, 257, 258, 324, 140, 141, 264/337, 338, 266, 267, 279.1, 136, 271.1

(56) References Cited

U.S. PATENT DOCUMENTS

| 2,351,235 | A | | 6/1944 | Shroyer et al. | ..................... 2/6 |
|---|---|---|---|---|---|
| 4,184,212 | A | | 1/1980 | Bowman | ........................... 2/5 |
| 4,466,138 | A | * | 8/1984 | Gessalin | ..................... 2/243 R |
| 4,656,674 | A | * | 4/1987 | Medwell | ........................ 2/410 |
| 4,722,817 | A | * | 2/1988 | Nakano et al. | ............. 264/29.5 |
| 4,820,568 | A | | 4/1989 | Harpell et al. | .............. 428/113 |
| 4,932,076 | A | | 6/1990 | Giorgio et al. | ..................... 2/5 |
| 5,018,220 | A | | 5/1991 | Lane et al. | ......................... 2/5 |
| 5,110,655 | A | | 5/1992 | Engler et al. | ............... 428/143 |
| 5,112,545 | A | * | 5/1992 | Spain et al. | ................. 264/103 |
| 5,160,776 | A | | 11/1992 | Li et al. | ..................... 428/109 |
| 5,330,820 | A | | 7/1994 | Li et al. | ..................... 428/113 |
| 5,349,893 | A | | 9/1994 | Dunn | ........................ 89/36.05 |

(Continued)

FOREIGN PATENT DOCUMENTS

| JP | 48-018670 | * | 3/1973 |
|---|---|---|---|
| JP | 55-3320 | * | 6/1978 |
| JP | 63-62716 | * | 3/1988 |
| JP | 63-135508 | * | 6/1988 |
| JP | 64-068572 | * | 3/1989 |
| JP | 1-145-106 | * | 6/1989 |
| JP | 04-106134 | * | 4/1992 |
| JP | 09-138097 | * | 5/1997 |
| JP | 11-322459 | * | 11/1999 |

OTHER PUBLICATIONS

Advertising Literature: Part Cost Reduction, Ceramic Technologies Corporation, 1993.

*Primary Examiner*—Stefan Staicovici
(74) *Attorney, Agent, or Firm*—Thompson Hine LLP

(57) ABSTRACT

A method for fabricating a protective helmet includes the steps of: (a) providing a fiber-based filler, such as a fiberglass sheeting; (b) mixing course ceramic particles into a thermoset resin; (c) impregnating the resin/ceramic particle mixture into the fiber-based filler; (d) forming or molding the impregnated fiber-based filler into a shape of a protective helmet; and (e) curing the resin mixture impregnated into the fiber-based filler. The course ceramic particles are preferably created by chopping a ceramic material. The presence of the ceramic particles in the composite helmet substantially reduces the heat reflectance of the helmet; while also reducing the overall weight of the helmet, since the ceramic material weighs less than the portion of resin material that the ceramic material is being used in place of. Finally, because the ceramic particles are course, they will not all flow to "low spots" in the helmet during the curing process. The course ceramic particles will remain entangled with, and caught on the fibers of the fiber-based filler during the curing process, thereby ensuring a more even distribution of the ceramic particles throughout the finished helmet.

62 Claims, 6 Drawing Sheets

U.S. PATENT DOCUMENTS

| | | |
|---|---|---|
| 5,368,922 A | 11/1994 | Portelli et al. |
| 5,424,021 A * | 6/1995 | Nakade et al. ............... 264/257 |
| 5,480,706 A | 1/1996 | Li et al. ...................... 428/113 |
| 5,517,691 A | 5/1996 | Blake ................................ 2/5 |
| 5,569,422 A * | 10/1996 | Astier et al. .................. 264/60 |
| 5,630,230 A * | 5/1997 | Fujino et al. ................. 2/200.1 |
| 5,661,854 A | 9/1997 | March, II ...................... 2/410 |
| 5,731,062 A * | 3/1998 | Kim et al. ................... 428/175 |
| 5,794,270 A | 8/1998 | Howat ........................... 2/410 |
| 5,794,271 A * | 8/1998 | Hastings ........................ 2/412 |
| 6,010,656 A | 1/2000 | Nomura et al. .............. 264/255 |
| 6,012,178 A * | 1/2000 | Schuster et al. ................ 2/412 |
| 6,098,197 A | 8/2000 | Hetzel, Jr. et al. |
| 6,211,305 B1 | 4/2001 | Hsu et al. |

* cited by examiner

FIBERGLASS COMPOSITE FIREFIGHTING HELMET AND METHOD FOR MAKING A FIBERGLASS COMPOSITE FIREFIGHTING HELMET

BACKGROUND

The present invention relates to protective head gear and, more particularly, to fiberglass composite firefighting helmets and methods for making such fiberglass composite firefighting helmets.

It is known to construct the protective shells of firefighter helmets with various composite materials that are specially designed to protect the wearer of the helmet in extremely adverse environments, which typically includes high heat environments. In such high heat environments it is important that the helmet have relatively high heat reflectance characteristics to increase the amount of time it will take the firefighter to become overheated. Additionally, it is also important that the helmet be as light as possible to decrease the stress on the wearer of the helmet. Of course, it is important that any improvements to the heat reflectance and weight of the helmet not sacrifice the relative durability of the helmet and the helmet's ability to protect the wearer's head from concussive blows. Accordingly, there is always a need to improve the construction of such firefighter helmet shells to increase the heat reflectance capability of the helmet, the durability of the helmet and/or to reduce the weight of the firefighting helmet, without sacrificing any of the other protective attributes of the helmet.

SUMMARY

The present invention provides a composite firefighting helmet and a method for constructing the composite firefighting helmet in which the heat reflectance of the firefighting helmet is substantially increased, in combination with the overall weight of the helmet being reduced, while not sacrificing any of the durability or concussive protection of the helmet.

In a first aspect of the present invention, a method for fabricating a protective helmet includes the steps of: (a) providing a fiber-based filler, such as a fiberglass sheeting; (b) mixing course ceramic particles into a thermoset resin; (c) impregnating the resin/ceramic particle mixture into the fiber-based filler; (d) forming or molding the impregnated fiber-based filler into a shape of a protective helmet; and (e) curing the resin mixture impregnated into the fiber-based filler. The course ceramic particles are preferably created by chopping ceramic material to an average size ranging from approximately 7 microns to approximately 8 microns. Preferably, the amount of course ceramic particles that is mixed into the thermoset resin is approximately 10% to approximately 20% of the weight of the thermoset resin.

The presence of the ceramic particles in the composite helmet substantially reduces the heat reflectance of the helmet; while also reducing the overall weight of the helmet, since the ceramic material weighs less than the portion of resin material that the ceramic material is being used in place of. Finally, because the ceramic particles are course, they will not all flow to "low spots" in the helmet during the curing process. The course ceramic particles will remain entangled with, and caught on the fibers of the fiber-based filler during the curing process, thereby ensuring a more even distribution of the ceramic particles throughout the finished helmet.

It is also preferred that the curing step includes the step of providing an appropriate amount of pressure and temperature to the impregnated fiber-based filler, for a sufficient period of time, such that the resin mixture flows around the fibers of the fiber-based filler and bonds to the fibers of the fiber-based filler. Such an appropriate temperature range will be from approximately 75° to approximately 350° F.; such an appropriate applied pressure range will be from approximately 70 psi to approximately 800 psi; and such a sufficient time period will range from approximately 30 seconds to approximately 10 minutes. In a specific embodiment, the appropriate temperature is approximately 128° F. and the sufficient period of time is approximately 8 minutes.

The resin can be a polyester, vinyl ester or an epoxy; all of which will include a curing agent, such as a catalyst, if necessary. In a specific embodiment, the thermoset resin is a "pure" vinyl ester, in which the catalyst is preferably mixed therein immediately prior to the impregnating step.

The fibers in the fiber-based filler may include fiberglass fibers, aramid fibers, azol fibers, any combination of such fibers, or any fiber or fiber combination having the appropriate reinforcing and structural characteristics necessary for the helmet's intended use. In a specific embodiment, the fiber-based filler includes a fiberglass mesh or batting sandwiched by at least a pair of woven or non-woven, thin fiberglass sheets.

It is another aspect of the invention to provide a method for fabricating a protective helmet that includes the steps of: (a) providing a male mold component; (b) providing a female mold component; (c) positioning a fiber-based filler between the male and female mold components; (d) mixing course ceramic particles into a thermoset resin, providing a resin mixture; (e) positioning the resin mixture between the male and female mold components; (f) curing the fiber-based filler and resin mixture together by pressing the male and female mold components together for a curing time. Preferably, the step of positioning the resin mixture between the male and female mold components includes a step of coating at least a portion of the fiber-based sheeting with at least a portion of the resin mixture. It is also preferred that the method include a step of coating at least a portion of one of the male and female mold components with another portion of the resin mixture, prior to positioning the fiber-based filler between the male and female mold components. This pre-coating of the resin mixture helps to reduce the propensity for the ceramic particles to flow to the "low spots" in the helmet during the curing stage; and therefore, this pre-coating step is especially useful for resin mixtures utilizing a ceramic particle that is not as course as that provided in the preferred embodiment.

Therefore, it is yet another aspect of the present invention to provide a method for fabricating a protective helmet, comprising the steps of: (a) providing a male mold component; (b) providing a female mold component; (c) mixing ceramic particles (which may or may not be course) into a thermoset resin, providing a resin mixture; (d) coating at least a portion of a first one of the male and female mold components with a first portion of the resin mixture; (e) after the coating step, positioning a fiber-based filler over the first portion of the resin mixture in the first mold component; (f) after the positioning step, applying a second portion of the resin mixture over the fiber-based filler; and (g) curing the fiber-based filler and resin mixture together by pressing the male and female mold components together for a curing time.

It is yet another aspect of the present invention to provide a method for fabricating a protective helmet that includes the steps of: (a) providing a male mold component; (b) providing a female mold component; (c) mixing course ceramic particles into a thermoset resin, providing a resin mixture; (d) coating at least a portion of a first one of the male and female mold components with a first portion of the resin mixture; (e) after the coating step, positioning a fiber-based sheeting over the resin mixture coating in the first mold component; (f) after the positioning step, applying a second portion of the resin mixture over the fiber-based sheeting; and (g) curing the fiber-based sheeting and resin mixture together by pressing the male and female mold components together for a curing time.

Preferably, the curing step includes a step of pressing the male and female mold components together for an appropriate amount of pressure and temperature, for a sufficient period of time, such that the resin mixture flows around the fibers of the fiber-based sheeting and bonds to the fibers of the fiber-based sheeting.

It is yet another aspect of the present invention to provide a protective helmet that includes a fiber-based filler impregnated with a cured resin and coarse ceramic particle mixture, where the impregnated fiber filler is formed into a shape having at least a bowl portion. Preferably, the cured resin coarse ceramic particle mixture includes chopped ceramic particles having an average size ranging from approximately 7 microns to approximately 8 microns; and preferably the mixing step includes the step of mixing an amount of the ceramic particles into the thermoset resin, where this amount is approximately 10 to approximately 20% of the weight of the thermoset resin.

While the preferred embodiments of the invention pertain to the fabrication of a fiber-composite protective helmet, it will be apparent to those of ordinary skill that the methods of the present invention may be used to fabricate relatively light-weight, heat-reflective fiber-composite objects useful for other purposes. For example, such fiber-composite objects fabricated according to the present invention may include, but are certainly not limited to: (a) protective objects adapted to be worn in hazardous duty environments, such as knee, elbow, shin, and forearm protectors; (b) fire-walls for vehicles; (c) or any other known or future application where heat blockage is desired.

It is therefore, yet another aspect of the present invention to provide a method for forming a relatively rigid, fiber-composite object that includes the steps of: (a) providing a fiber-based filler, such as a fiber-based sheeting; (b) mixing coarse ceramic particles into a thermoset resin, providing a resin mixture; (c) impregnating the resin mixture into the fiber-based filler; (d) forming the impregnated fiber-based filler into a desired shape; and (e) curing the resin mixture to form a relatively rigid, fiber-composite object.

Accordingly, it is an object of the present invention to provide a method for fabricating fiber-composite objects, such as firefighter helmet shells, that are relatively light-weight and that have relatively high heat reflectance characteristics. It is another object to improve the construction of firefighter helmet shells to increase the heat reflectance capability of the helmet, the durability of the helmet and/or to reduce the weight of the firefighting helmet, without sacrificing any of the other protective attributes of the helmet. These and other objects and advantages of the present invention will be apparent from the following description, the attached drawings and the appended claims. It is to be understood, however, that it is not necessary to meet any or all of the stated advantages or objects of the present invention disclosed herein in order to fall within the scope of any claims, since the invention is defined by the claims and since inherent and/or unforseen advantages of the present invention may exist even though they may not be explicitly discussed herein.

DETAILED DESCRIPTION

Figure 1:
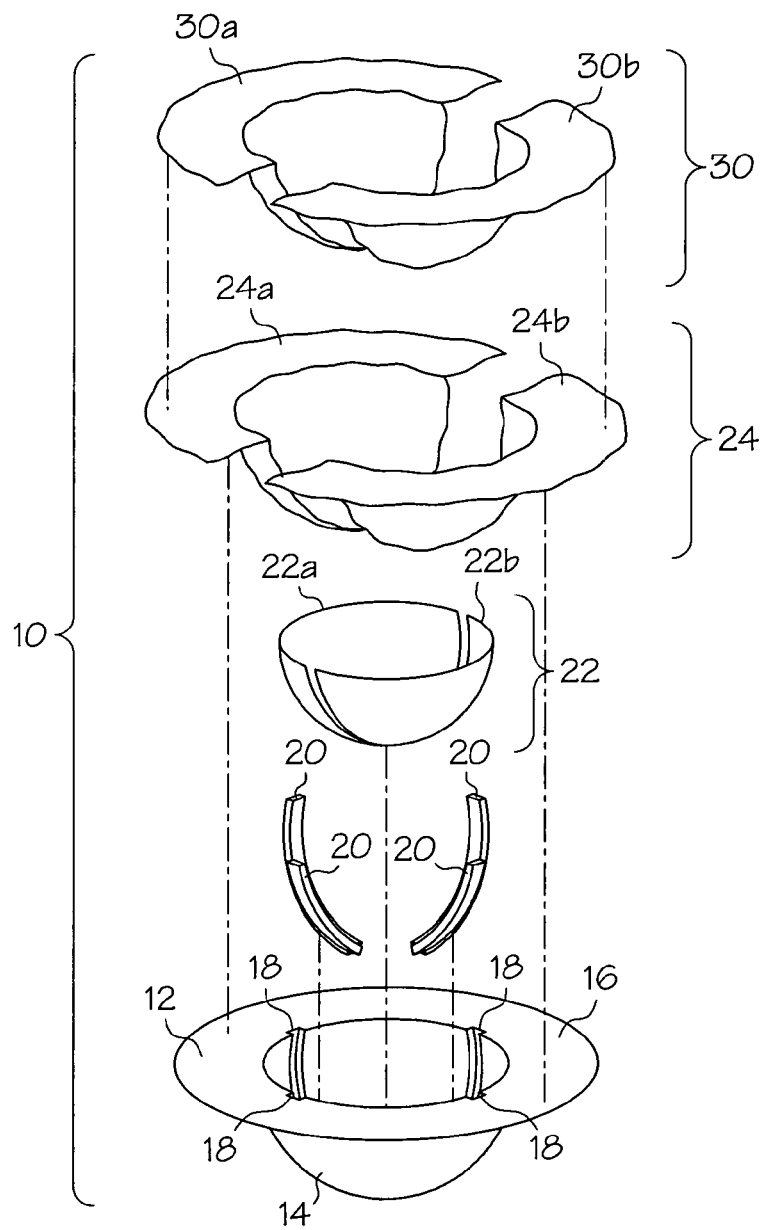
FIG. 1 illustrates the various components of a "glass back" component along with a negative mold for constructing the glass back component, the glass back component providing the fiber-based filler for the construction of the protective helmet according to a preferred embodiment of the present invention.

As shown in FIG. 1, a fiber-based filler, which, in the preferred embodiment is a "glass back" component 10 is constructed within a shell 12. The shell 12 is essentially a negative impression of an outer surface of a firefighting helmet; including a bowl portion 14 and a brim portion 16, and where the inner surface of the bowl portion includes a plurality of grooves 18 that are used for creating the ribs on the glass back 10, as will be discussed below.

The first step in fabricating and constructing the glass back 10 is to insert a plurality of strips of fiberglass sheeting 20 into the corresponding grooves 18 of the shell 12. Next, a bowl-shaped veil 22 is inserted into the shell 12 and attached to the ribs 20 with a light adhesive spray. In the exemplary embodiment, the veil 22 is composed of at least two segments 22a and 22b to reduce the number of wrinkles and irregularities in the glass back 10 and to ease in the manufacturing process. Next, the major fiberglass sheeting material 24 is inserted into the shell and attached to the veil 22 and ribs 20 by a light adhesive spray.

Figure 2:
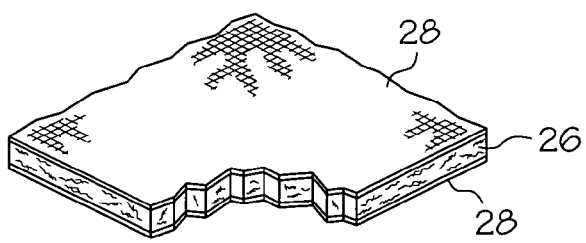
FIG. 2 provides a perspective view of a preferred fiberglass sheeting construction for use with the present invention.

Referring to FIG. 2, the major fiberglass sheeting 24 and the strips of fiberglass sheeting 20 are, in the exemplary embodiment, composed of an inner layer of mesh-like, very fine, fiberglass fibers 26 sandwiched between a pair of woven or non-woven thin fiberglass sheets of material 28. Preferably, the mesh-like layer 26 is approximately 0.070 inches thick and the total sheeting is approximately 0.090 inches thick. Such a fiberglass sheeting material is commercially available from Owens Corning.

Referring back to FIG. 1, in the exemplary embodiment, the major sheeting 24 is broken up into at least two segments 24a, 24b where each segment preferably includes a brim portion and a bowl portion corresponding to the brim and bowl portions of the firefighting helmet. Again, the multiple segments 24a, 24b, of the major sheeting 24 helps to reduce the number of wrinkles and irregularities in the glass back 10 and to ease in the glass-back assembly process. Finally, a woven glass cloth 26, 30 is applied over the primary sheeting 24 with a light adhesive to act as a rebar. In the exemplary embodiment, the woven glass cloth 30 is comprised of at least two segments 30a, 30b to control wrinkles and to simplify the assembly process. When all of the components 20, 22, 24 and 30 of the glass back 10 are fastened together, the glass back 10 is removed from the shell 12 and saved for use as a fiber-based filler in the manufacturing process of the firefighting helmet as will be discussed below.

It should be apparent that the use of fiberglass sheeting and the construction of a glass back 10 are merely the exemplary means to provide a fiber-based filler used as reinforcement in the composite helmet, and that it is within the scope of the invention to utilize other forms of fiber-based filler (such as loose fibers, for example). Also, while the fiber-based filler is preferably fiberglass, it is within the scope of the invention to utilize other types of reinforcing fibers such as, for example, aramid fibers, azol fibers, or any combination of glass, aramid or azol fibers.

Figure 3:
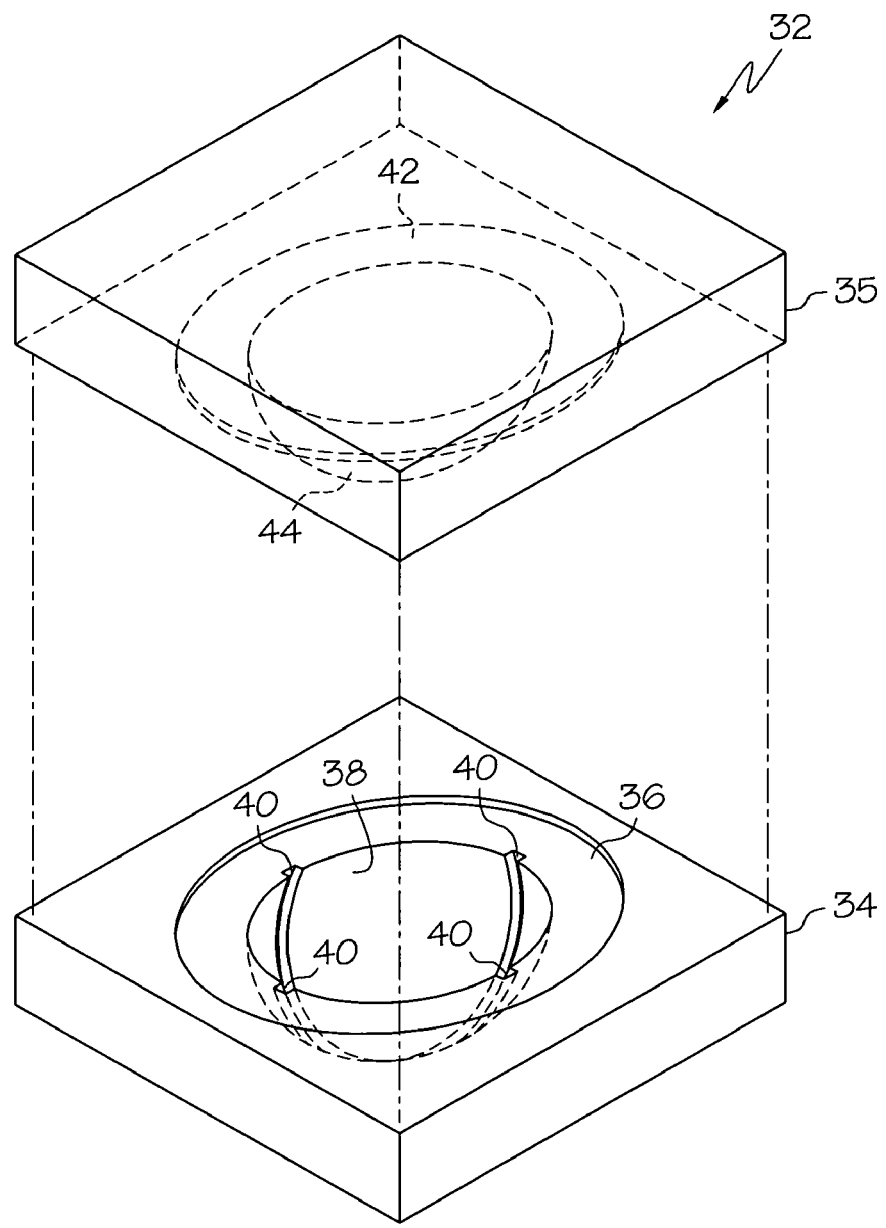
FIG. 3 is a schematic, perspective view of a mold for use with the process of the present invention.

As shown in FIG. 3, the mold 32 used for fabricating the firefighting helmet of the preferred embodiment of the present invention includes a female mold component 34 and a male mold component 35. The female mold component 34 includes an annular recess 36 for forming the brim of the firefighting helmet therein and a hemispherical indentation 38 forming the bowl portion of the firefighting helmet therein. The hemispherical bowl portion also includes a plurality of notches 40 for forming the corresponding plurality of ribs that will appear on the outer surface of the bowl portion of the firefighting helmet. The male mold component 35 will include a slightly raised brim portion 42 and a hemispherical dome 44 extending therefrom for being received within the hemispherical cavity 38. The recess 36, hemispherical indentation 38 and notches 40 of the female mold component 34 and the raised portion 42 and dome 44 of the male mold component 35 provide active surfaces for molding the firefighter helmet therebetween during the curing step, described below.

A preliminary step in the manufacturing process is to create a resin and course ceramic particle mixture. Generally, this step involves mixing course ceramic particles into a thermoset resin. Preferably, the course ceramic particles are created by chopping a ceramic material down to an average size of approximately 7 to approximately 8 microns. It is within the scope of the invention, however, to chop the ceramic into course particles having an average size ranging from approximately 3 microns to approximately 1000 microns. In the exemplary embodiment, the median particle size of the chopped ceramic particles is approximately 7.6 microns. Such chopped ceramic particles are available from Ceramic Technologies Corporation, of Howley, Iowa, having a product ID KZ-009.

Preferably, the resin is a pure vinyl ester; which, in the preferred embodiment is a 99835 resin. Nevertheless, it is within the scope of the invention to use other suitable thermoset or curable resins such as polyesters, vinyl esters or epoxies, or any combination of such.

Preferably, the amount of coarse ceramic particles to mix into the thermoset resin ranges from approximately 10% to approximately 20% of the weight of the thermoset resin; and in the exemplary embodiment, 4½ lbs of coarse ceramic particles will be mixed into every 30 lbs of thermoset resin (approximately 15% of the weight of the thermoset resin). Nevertheless, it is within the scope of the invention to use any suitable ratio of ceramic particles and thermoset resin. It is also preferred that, once the coarse ceramic particles are mixed into the thermoset resin, the mixture be stirred constantly until it is applied to the fiber-based filler or within the mold as will be described below. This constant mixing will ensure that the coarse ceramic particles remain substantially evenly distributed throughout the thermoset resin. It is also preferred that a suitable catalyst will also be added to the mixture immediately before the mixture is first applied to the fiber-based filler or within the mold as described below. With the exemplary embodiment, approximately 5 ml of suitable catalyst is added to the 34½ lbs of mixture prior to application. Suitable dyes or colors may also be added to the mixture to achieve a desired color for the finished product.

Figure 4:
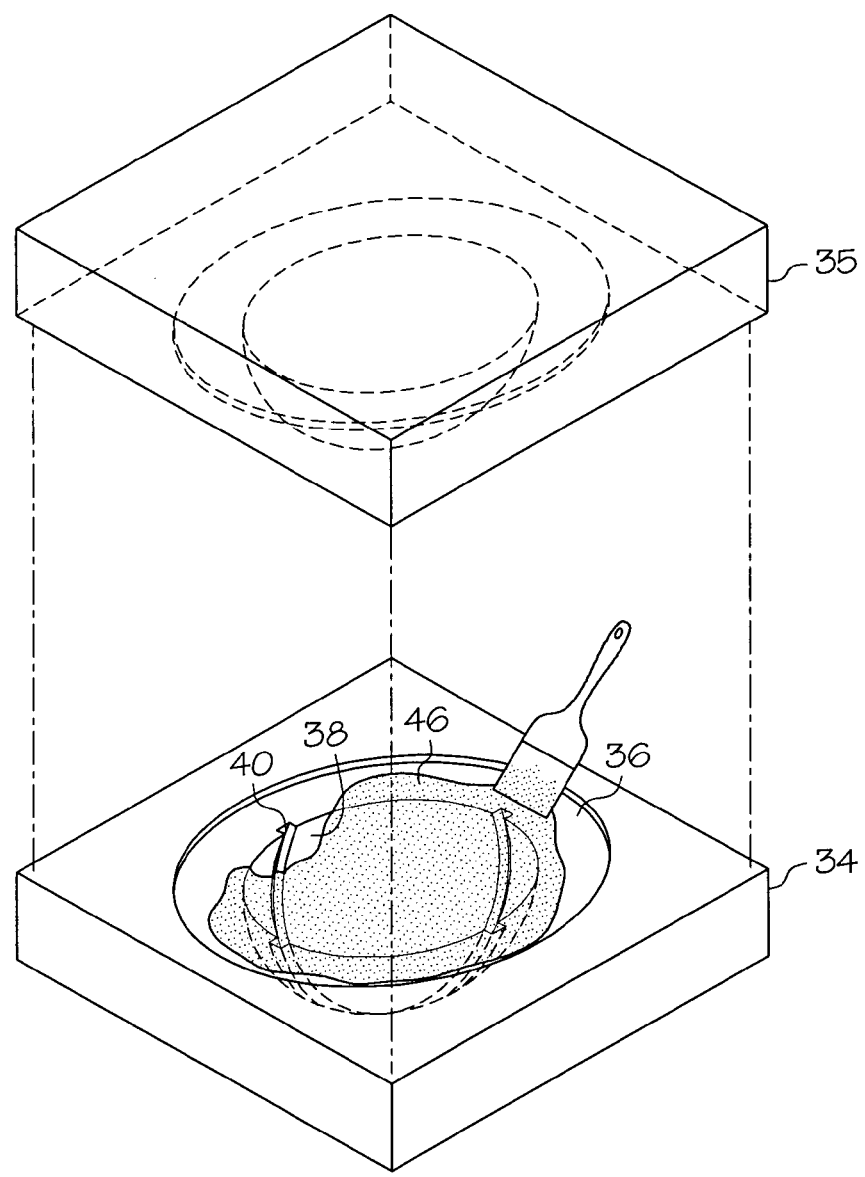
FIG. 4 illustrates a process step of the preferred embodiment of the present invention utilizing the mold component.
Figure 5:
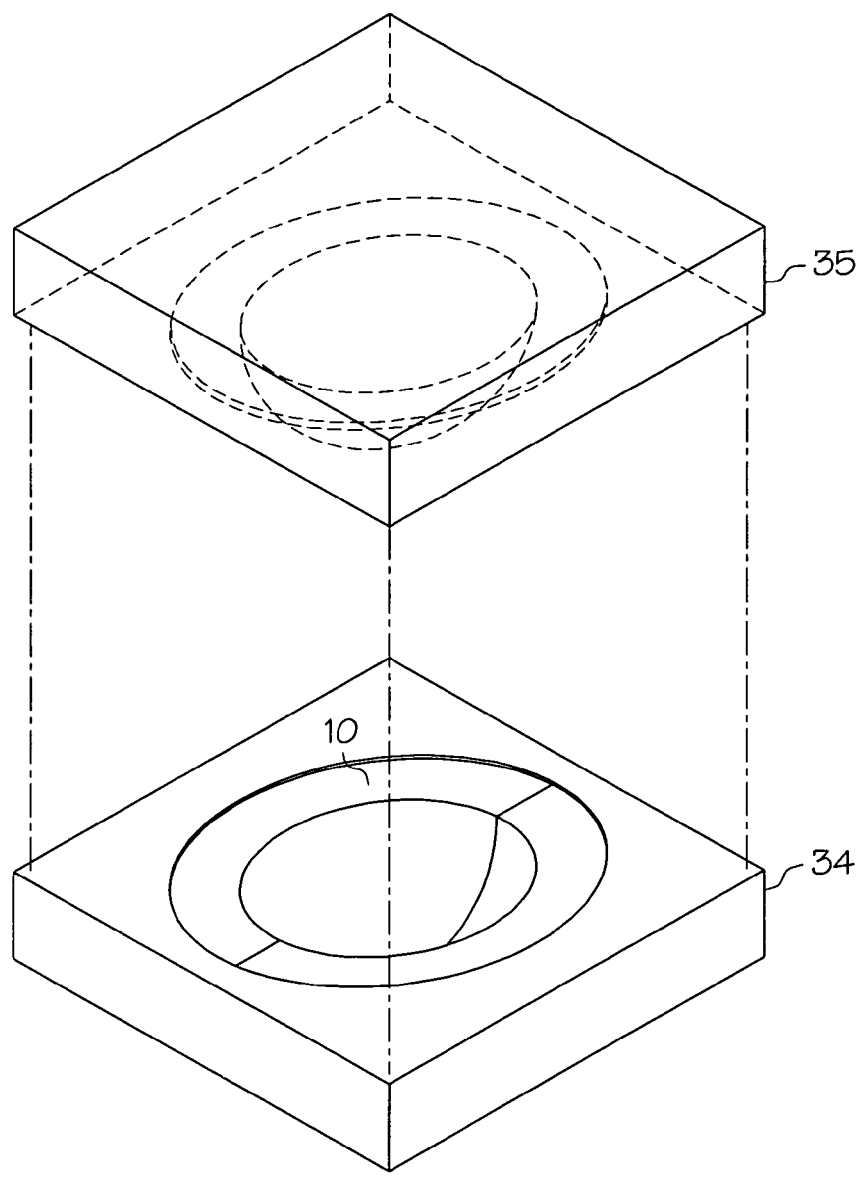
FIG. 5 illustrates another process step of the preferred embodiment of the present invention utilizing the mold component.
Figure 6:
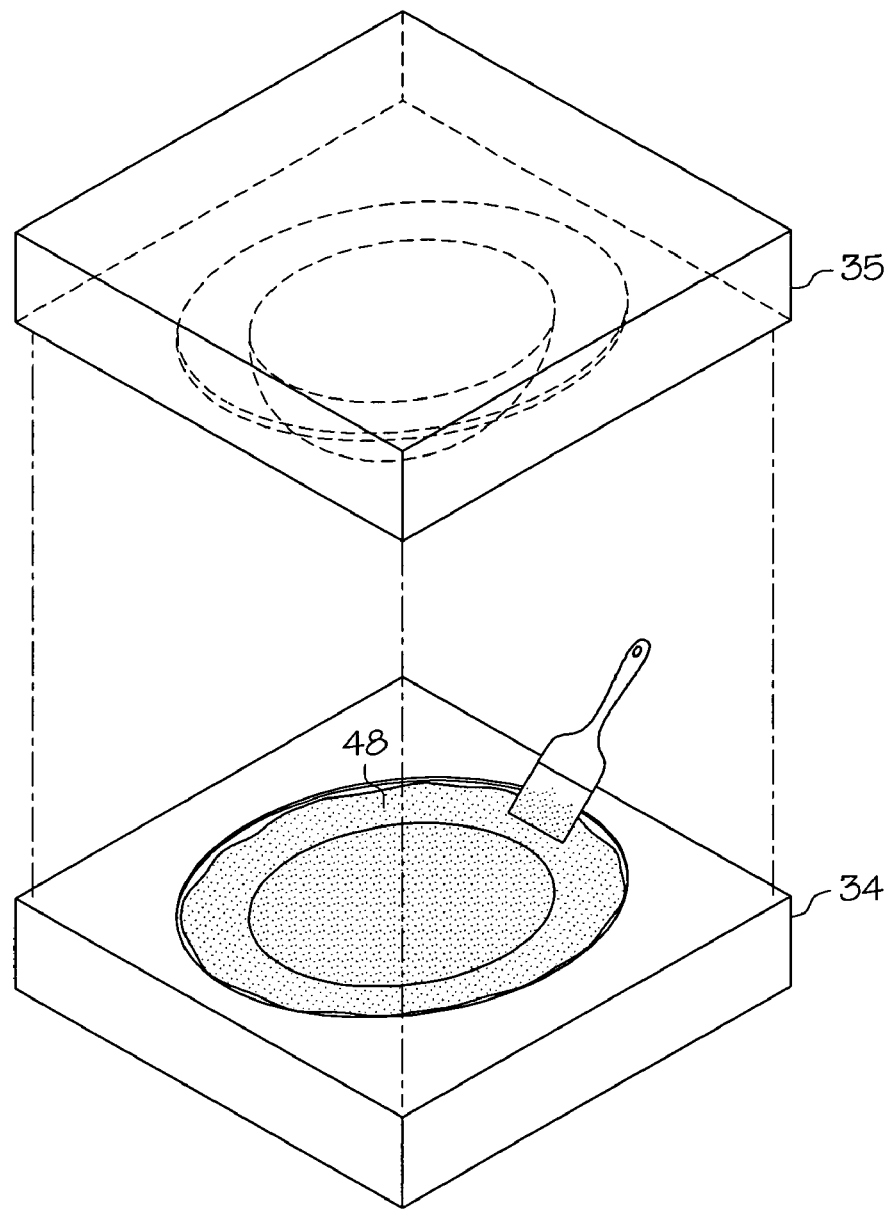
FIG. 6 illustrates another process step of the preferred embodiment of the present invention utilizing the mold component.
Figure 7:
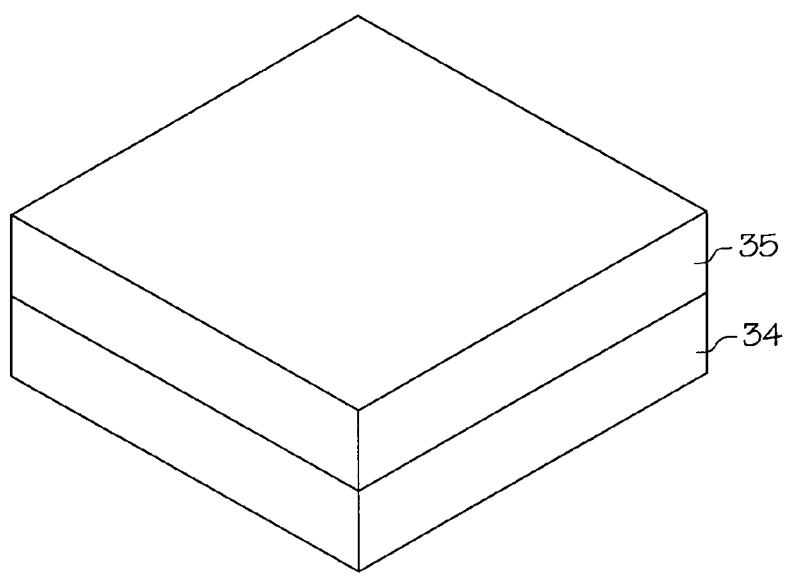
FIG. 7 illustrates another process step of the preferred embodiment of the present invention utilizing the mold component.

As illustrated in FIG. 4, a first step in the process of fabricating a firefighter helmet according to a exemplary embodiment of the present invention is to a first coat of the catalyzed resin mixture to the active surfaces of 36, 38 & 40 of the female mold component 34. The amount of the resin mixture to use in this first coat is preferably approximately ¼ to ⅓ of the total resin mixture that will be used for the entire helmet. As illustrated in FIG. 5, a next step in the process is to place the glass back 10 (the construction of which is described above) over the first coat 46 of the resin mixture in the female mold component 34, such that the brim portion of the glass back 10 received within the annular recess 36 and such that the bowl portion of the glass back 10 is received within the hemispherical indentation 38. Of course the ribs 20 of the glass back 10 are received within the notches 40 of the female mold component 34. As shown in FIG. 6, a next step in the process is to coat the exposed surfaces fthe glass back 10 in the female mold 34 with the remainder of the resin mixture 48 that will be used to fabricate the entire helmet. Finally, as shown in FIG. 7, a next step in the process is to activate the mold device such that the male mold component 35 and the female mold component 34 press against each other for a sufficient amount of time, applying a sufficient pressure and temperature, such that the thermoset resin mixture flows around the fibers of the glass block 10 and begin to cure so as to form a substantially rigid shell for a firefighter helmet. Once sufficiently cured, the mold components can be opened again and the shell of the firefighter helmet may be removed therefrom. Subsequently, the shell can be trimmed (if necessary) and the final helmet components, such as webbing, face mask, etc. can be assembled thereto.

The sufficient temperature applied by the mold may range from approximately 75° to approximately 350° F., the appropriate pressure applied by the mold may range from approximately 70 to approximately 800 psi; and the sufficient amount of time to apply such appropriate pressure and temperature ranges from approximately 30 seconds to approximately 10 minutes. In the exemplary embodiment, the appropriate pressure is approximately 125 psi, the appropriate temperature is approximately 128° F. and the appropriate amount of time to apply such pressure and temperature is approximately 8 minutes.

The presence of the ceramic particles in the finished composite helmet substantially reduces the heat reflectance of the helmet; while also reducing the overall weight of the helmet, since the ceramic material weighs less than the portion of resin material that the ceramic material is being used in place of. Finally, because the ceramic particles are course, they will not all flow "low spots" in the helmet during the curing process. The course ceramic particles will remain entangled with, and caught on the fibers of the fiber-based filler during the curing process, thereby ensuring a more even distribution of the ceramic particles throughout the finished helmet. Furthermore, the pre-coating of the resin mixture to the mold component (FIG. 4) helps to reduce the propensity for the ceramic particles to flow to the "low spots" in the helmet during the curing stage; and therefore, this pre-coating step is especially useful for resin mixtures utilizing a ceramic particle that is not as course as the chopped ceramic particles provided in the preferred embodiment.

While the exemplary embodiments of the invention, described above, pertain to the fabrication of a fiber-composite protective helmet, it will be apparent to those of ordinary skill that the methods of the present invention may be used to fabricate relatively light-weight, heat-reflective fiber-composite objects useful for other purposes. For example, such fiber-composite objects fabricated according to the present invention may include, but are certainly not limited to: (a) protective objects adapted to be worn in hazardous duty environments, such as knee, elbow, shin, and forearm protectors; (b) fire-walls for vehicles; or (c) any other known or future application where heat blockage is desired. Such relatively rigid, fiber-composite objects may be constructed according to the following steps: providing a fiber-based filler, such as a fiber-based sheeting; mixing coarse ceramic particles into a thermoset resin; impregnating the resin mixture into the fiber-based filler; forming the impregnated fiber-based filler into a desired shape; and curing the resin mixture to form a relatively rigid, fiber-composite object. The impregnating, forming and curing steps are preferably performed by a mold providing an appropriate amount of pressure and temperature, for a sufficient amount of time, on the combination of the fiber-based filler and resin mixture.

Following from the above description and summaries, it should be apparent to those of ordinary skill in the art that, while the designs and processes herein described constitute preferred embodiments of the present invention, it is to be understood that the invention is not limited to these precise designs and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims. For example, it is to be understood that it is within the scope of the invention to utilize any size of coarse ceramic particles, unless such sizes are specifically claimed; it is to be understood that it is within the scope of the invention to cure the resin material (i.e., change the properties of the resin material) without application of the specific temperatures and/or pressures listed above, unless such temperatures and/or pressures are specifically claimed; and it is also to be understood that the listed times for applying such temperatures is not intended to be limiting unless specifically claimed.

What is claimed is:

1. A method for fabricating a protective helmet for use in a firefighting environment, comprising the steps of:
   providing a fiber-based filler;
   mixing coarse ceramic particles into a thermoset resin, thereby providing a resin mixture wherein said ceramic particles have an average size of between about 3 microns and about 1000 microns to improve the heat reflectivity of said helmet while maintaining sufficient strength of said helmet;
   impregnating the resin mixture into the fiber-based filler;
   forming the impregnated fiber-based filler into a shape of a protective helmet having a generally continuous generally hemispherical bowl portion; and
   after said impregnating step, curing the resin mixture.

2. The method of claim 1, wherein the coarse ceramic particles are created by a step of chopping the ceramic particles.

3. The method of claim 1, wherein the ceramic particles have an average size ranging from approximately 7 microns to approximately 8 microns to improve the heat reflectivity of said helmet while maintaining sufficient strength of said helmet.

4. The method of claim 3, wherein the mixing step includes the step of mixing an amount of the ceramic particles into the thermoset resin, wherein the amount of ceramic particles is approximately 10 to approximately 20 percent of the weight of the thermoset resin to improve the heat reflectivity of said helmet while maintaining sufficient strength of said helmet.

5. The method of claim 1, wherein the curing step includes a step of providing an appropriate amount of pressure and temperature to the impregnated fiber-based filler, for a sufficient period of time, such that the resin mixture flows around the fibers of the fiber-based filler and bonds to the fibers of the fiber based filler.

6. The method of claim 5, wherein:
   the appropriate temperature applied ranges from approximately 75 to approximately 350 F.;
   the appropriate pressure applied ranges from approximately 70 psi to approximately 800 psi; and
   the sufficient period of time ranges from approximately 30 seconds to approximately 10 minutes.

7. The method of claim 6, wherein the appropriate temperature is approximately 128 F. and the sufficient period of time is approximately 8 minutes.

8. The method of claim 1, wherein the thermoset resin is selected from a group consisting of polyesters, vinyl esters and epoxies and wherein a curing agent is added to the thermoset resin.

9. The method of claim 8, wherein the thermoset resin is a vinyl ester.

10. The method of claim 8, wherein the curing agent is a catalyst and the method includes the step of, prior to the impregnating step, mixing the curing agent with either the thermoset resin or the resin mixture.

11. The method of claim 1, wherein said bowl portion is generally entirely made of fibers that are selected from a group consisting of glass fibers, aramid fibers, azol fibers and any combination of glass, aramid and azol fibers.

12. The method of claim 11, wherein the bowl portion includes a fiber-based sheeting.

13. The method of claim 12, wherein the bowl portion includes a fiber mesh or batting attached to at least one substrate of a woven or non-woven fiber sheet.

14. The method of claim 13, wherein the fiber-based sheeting is approximately 0.090 inches thick.

15. The method of claim 13, wherein a substantial portion of the fiber-based sheeting includes glass fibers.

16. The method of claim 12, wherein the fiber-based sheeting is assembled into an approximate shape of a helmet prior to the impregnating step.

17. A method for fabricating a protective helmet for use in a firefighting environment, comprising the steps of:
   providing a male mold component;
   providing a female mold component;

positioning a fiber-based filler between the male and female mold components, said fiber-based filler having a generally continuous generally hemispherical bowl portion;

mixing coarse ceramic particles into a thermoset resin, thereby providing a resin mixture;

impregnating the resin mixture into the fiber-based filler;

positioning the impregnated resin mixture between the male and female mold components;

curing the impregnated resin mixture by pressing the male and female mold components together for a curing time.

18. The method of claim 17, wherein the step of positioning the resin mixture between the male and female mold components includes a step of coating at least a portion of the fiber-based filler with at least a portion of the resin mixture.

19. The method of claim 18, further comprising the step of coating at least a portion of at least one of the male and female mold components with at least a portion of the resin mixture, prior to positioning the fiber-based filler between the male and female mold components.

20. The method of claim 17, wherein the coarse ceramic particles are created by a step of chopping a ceramic material.

21. The method of claim 17, wherein the ceramic particles have an average size ranging from approximately 7 microns to approximately 8 microns.

22. The method of claim 21, wherein the mixing step includes the step of mixing an amount of the ceramic particles into the thermoset resin, wherein the amount of ceramic particles is approximately 10 to approximately 20 percent of the weight of the thermoset resin.

23. A method for fabricating a protective helmet for use in a firefighting environment, comprising the steps of:

providing a male mold component;

providing a female mold component;

mixing coarse ceramic particles into a liquid thermoset resin, thereby providing a resin mixture;

coating at least a portion of a first one of the male and female mold components with a first portion of the liquid resin mixture;

after the coating step, positioning a fiber-based filler over the first portion of the resin mixture in the first mold component, said fiber-based filler having a generally continuous generally hemispherical bowl portion;

after the positioning step, applying a second portion of the liquid resin mixture over the fiber-based filler; and curing the fiber-based filler and resin mixture together by pressing the male and female mold components together for a curing time, whereby the resin mixture impregnates the fiber-based filler.

24. The method of claim 23, wherein the coarse ceramic particles are created by a step of chopping a ceramic material.

25. The method of claim 24, wherein the ceramic particles have an average size ranging from approximately 7 microns to approximately 8 microns to improve the heat reflectivity of said helmet while maintaining sufficient strength of said helmet.

26. The method of claim 25, wherein the mixing step includes the step of mixing an amount of the ceramic particles into the thermoset resin, wherein the amount of ceramic particles is approximately 10 to approximately 20 percent of the weight of the thermoset resin to improve the heat reflectivity of said helmet while maintaining sufficient strength of said helmet.

27. The method of claim 23, wherein the curing step includes a step of pressing the male and female mold components together at an appropriate amount of pressure and temperature, for a sufficient period of time, such that the resin mixture flows around the fibers of the fiber-based filler and bonds to the fibers of the fiber based filler.

28. The method of claim 27, wherein:

the appropriate temperature applied ranges from approximately 75 to approximately 350 F.;

the appropriate pressure applied ranges from approximately 70 psi to approximately 800 psi; and the sufficient period of time ranges from approximately 30 seconds to approximately 10 minutes.

29. The method of claim 28, wherein the appropriate temperature is approximately 128 F and the sufficient period of time is approximately 8 minutes.

30. The method of claim 23, wherein the thermoset resin is selected from a group consisting of polyesters, vinyl esters and epoxies and wherein a curing agent is added to the thermoset resin.

31. The method of claim 30, wherein the thermoset resin is a vinyl ester.

32. The method of claim 30, wherein the curing agent is a catalyst and the method includes the step of, prior to the coating step, mixing the curing agent with either the thermoset resin or the resin mixture.

33. The method of claim 23, wherein the bowl portion includes a fiber-based sheeting.

34. The method of claim 23, wherein said bowl portion is generally entirely made of fibers that are selected from a group consisting of glass fibers, aramid fibers, azol fibers and any combination of glass, aramid and azol fibers.

35. The method of claim 33, wherein the bowl portion includes a fiber mesh or batting bonded to at least one substrate of a woven or non-woven fiber sheet.

36. A method for fabricating a protective helmet for use in a firefighting environment, comprising the steps of:

providing a male mold component;

providing a female mold component;

mixing ceramic particles into a thermoset resin, thereby providing a resin mixture;

coating at least a portion of a first one of the male and female mold components with a first portion of the resin mixture;

after the coating step, positioning a fiber-based filler over the first portion of the resin mixture in the first mold component, said fiber-based filler having a generally continuous generally hemispherical bowl portion;

after the positioning step, applying a second portion of the resin mixture over the fiber-based filler wherein at least one of said positioning or applying steps causes said fiber-based filler to be impregnated with said resin mixture; and curing the impregnated resin mixture by pressing the male and female mold components together for a curing time, whereby the resin mixture impregnates the fiber-based filler.

37. The method of claim 36, wherein the ceramic particles are chopped ceramic particles.

38. A method for forming a relatively rigid, fiber composite object for use in a firefighting environment comprising the steps of:

providing a fiber-based filler;

mixing coarse ceramic particles into a thermoset resin, thereby providing a resin mixture;

impregnating the resin mixture into the fiber-based filler;

forming the fiber-based filler into a desired shape having a generally continuous generally hemispherical bowl portion; and after said impregnating step curing the resin mixture to form a relatively rigid, fiber composite object.

39. The method of claim 38, wherein the coarse ceramic particles are created by a step of chopping a ceramic material.

40. The method of claim 38, wherein the ceramic particles have an average size ranging from approximately 7 microns to approximately 8 microns to improve the heat reflectivity of said helmet while maintaining sufficient strength of said helmet.

41. The method of claim 38, wherein the mixing step includes the step of mixing an amount of the ceramic particles into the thermoset resin, wherein the amount of ceramic particles is approximately 10 to approximately 20 percent of the weight of the thermoset resin to improve the heat reflectivity of said helmet while maintaining sufficient strength of said helmet.

42. The method of claim 38, wherein the curing step includes a step of providing an appropriate amount of pressure and temperature to the impregnated fiber-based filler, for a sufficient period of time, such that the resin mixture flows around the fibers of the fiber-based filler and bonds to the fibers of the fiber based filler.

43. The method of claim 42, wherein:
the appropriate temperature applied ranges from approximately 75 to approximately 350 F.;
the appropriate pressure applied ranges from approximately 70 psi to approximately 800 psi; and
the sufficient period of time ranges from approximately 30 seconds to approximately 10 minutes.

44. The method of claim 43, wherein the appropriate temperature is approximately 128 F. and the sufficient period of time is approximately 8 minutes.

45. The method of claim 38, wherein the thermoset resin is selected from a group consisting of polyesters, vinyl esters and epoxies and wherein a curing agent is added to the thermoset resin.

46. The method of claim 45, wherein the thermoset resin is a vinyl ester.

47. The method of claim 45, wherein the curing agent is a catalyst and the method includes the step of, prior to the impregnating step, mixing the curing agent into either the thermoset resin or the resin mixture.

48. The method of claim 38, wherein said bowl portion is generally entirely made of fibers that are selected from a group consisting of glass fibers, aramid fibers, azol fibers and any combination of glass, aramid and azol fibers.

49. The method of claim 48, wherein the bowl portion includes a fiber-based sheeting.

50. The method of claim 49, wherein the bowl portion includes a fiber mesh or batting bonded to at least one substrate of a woven or non-woven fiber sheet.

51. The method of claim 50, wherein a substantial portion of the bowl portion includes glass fibers.

52. The method of claim 1 wherein said curing step includes curing said resin mixture until said helmet is generally rigid.

53. The method of claim 1 wherein said providing, mixing, impregnating, forming and curing step are carried out such that the protective helmet meets National Fire Protection Association Standards 1971–2000 top impact, acceleration impact and penetration resistance tests.

54. The method of claim 1 wherein said thermoset resin is in a liquid form during said mixing step, and wherein said resin mixture is in a liquid form during said impregnating step.

55. The method of claim 17 wherein said bowl portion is generally entirely made of fibers that are selected from a group consisting of glass fibers, aramid fibers, azol fibers and any combination of glass, aramid and azol fibers.

56. The method of claim 38 wherein said forming step takes place after said impregnating step.

57. The method of claim 1 wherein the recited steps are carried out to provide a helmet with relatively high heat reflectivity.

58. The method of claim 17 wherein the recited steps are carried out to provide a helmet with relatively high heat reflectivity.

59. The method of claim 23 wherein the recited steps are carried out to provide a helmet with relatively high heat reflectivity.

60. The method of claim 36 wherein the recited steps are carried out to provide a helmet with relatively high heat reflectivity.

61. The method of claim 38 wherein the recited steps are carried out to provide a helmet with relatively high heat reflectivity.

62. The method of claim 38 further comprising the step of coupling a set of reinforcing ribs to said generally continuous generally hemispherical bowl portion.

* * * * *